(12) United States Patent
Chao et al.

(10) Patent No.: US 10,955,359 B2
(45) Date of Patent: Mar. 23, 2021

(54) METHOD FOR QUANTIFICATION OF PROCESS NON UNIFORMITY USING MODEL-BASED METROLOGY

(71) Applicant: International Business Machines Corporation, Armonk, NY (US)

(72) Inventors: Robin Hsin-Kuo Chao, Wappingers Falls, NY (US); Yunlin Zhang, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 890 days.

(21) Appl. No.: 14/077,235

(22) Filed: Nov. 12, 2013

(65) Prior Publication Data

US 2015/0134286 A1    May 14, 2015

(51) Int. Cl.
*G01N 21/95*     (2006.01)
*G01B 11/06*     (2006.01)
*G01N 21/84*     (2006.01)
*G01N 21/956*    (2006.01)

(52) U.S. Cl.
CPC ..... *G01N 21/9501* (2013.01); *G01B 11/0625* (2013.01); *G01B 2210/56* (2013.01); *G01N 21/8422* (2013.01); *G01N 21/956* (2013.01); *G01N 2021/8461* (2013.01)

(58) Field of Classification Search
CPC ....... G01N 21/9501; G01N 2021/8461; G01N 2021/3595; G01N 21/3563; G01N 21/359; G01N 15/1459; G01B 11/0625; G01B 2210/56; G01B 11/0683; H01L 22/20;

(Continued)

(56) References Cited

U.S. PATENT DOCUMENTS 5,077,774  A  * 12/1991  Piestrup .............. G03F 7/70033
                                                 378/119
5,121,337  A  *  6/1992  Brown ................. G01N 21/274
                                                 250/339.12

(Continued)

FOREIGN PATENT DOCUMENTS

WO     WO 2006091781 A1 *  8/2006  ......... G01B 11/0616

OTHER PUBLICATIONS

Yu et al, "DeMonS—A New Deconvolution Method for Estimating Drug Absorbed at Different Time Intervals and/or Drug Disposition Model Parameters Using a Monotonic Cubic Spline", Biopharmaceutics & Drug Disposition, vol. 18:6, 475-487 (1997).*

(Continued)

*Primary Examiner* — Alexander Satanovsky
*Assistant Examiner* — Leonard S Liang
(74) *Attorney, Agent, or Firm* — Cantor Colburn LLP; Erik Johnson

(57) ABSTRACT

Embodiments of the present invention provide an improved method and system for assessing non-uniformity of features in the measurement area (within the beam spot) on a semiconductor structure, (e.g. wafer), such as a non-uniform film thickness. The scattering from non-uniform features is modeled. Post-processing the residual of theoretical and collected spectra is performed to assess a measure of non-uniformity from within an incident spot beam of a spectrum acquisition tool.

14 Claims, 4 Drawing Sheets

(58) Field of Classification Search
CPC .. G07C 3/14; G01R 23/16; G01H 3/08; G01J 3/453; G01J 3/02; B24B 37/013
USPC ............ 250/339.08, 339.11, 559.27; 356/73, 356/381, 382, 630, 446; 703/6, 2; 427/8; 118/708
See application file for complete search history.

(56) References Cited

U.S. PATENT DOCUMENTS

| | | | | |
|---|---|---|---|---|
| 5,291,415 | A * | 3/1994 | Zarowin | G01B 11/0616 216/59 |
| 5,308,982 | A * | 5/1994 | Ivaldi | G01J 3/28 250/339.12 |
| 5,313,406 | A * | 5/1994 | Kauppinen | G01N 21/3504 250/339.08 |
| 5,900,633 | A * | 5/1999 | Solomon | G01B 11/0625 250/339.08 |
| 5,964,643 | A * | 10/1999 | Birang | B24B 37/013 451/285 |
| 5,982,486 | A * | 11/1999 | Wang | G01J 3/453 356/451 |
| 5,982,496 | A * | 11/1999 | Ziger | G01B 11/0633 250/341.1 |
| 6,056,434 | A * | 5/2000 | Champetier | G01J 5/0003 219/411 |
| 6,677,170 | B1 * | 1/2004 | Markle | G01B 11/0625 438/16 |
| 6,697,153 | B1 | 2/2004 | Wright et al. | |
| 6,891,626 | B2 * | 5/2005 | Niu | G01B 11/0675 356/625 |
| 7,106,432 | B1 | 9/2006 | Mapoles | G01N 21/9501 250/559.45 |
| 7,184,152 | B2 | 2/2007 | Brill | |
| 7,233,390 | B2 | 6/2007 | Chang et al. | |
| 7,268,876 | B1 | 9/2007 | Johs | |
| 7,271,918 | B2 * | 9/2007 | De Groot | G01B 11/0675 356/497 |
| 7,394,535 | B1 * | 7/2008 | Chen | B82Y 20/00 257/E21.53 |
| 7,463,369 | B2 | 12/2008 | Wack et al. | |
| 7,465,590 | B1 * | 12/2008 | Feng | G01B 11/0625 257/E21.521 |
| 7,733,502 | B2 | 6/2010 | Moriya et al. | |
| 8,214,771 | B2 * | 7/2012 | Adel | G03F 7/705 356/625 |
| 8,346,506 | B2 * | 1/2013 | Vuong | G01N 21/4788 702/181 |
| 9,116,834 | B2 * | 8/2015 | Van Beurden | G01N 21/4788 |
| 9,490,182 | B2 * | 11/2016 | Shchegrov | H01L 22/12 |
| 9,816,810 | B2 * | 11/2017 | Shchegrov | H01L 22/12 |
| 9,875,946 | B2 * | 1/2018 | Shchegrov | H01L 22/12 |
| 2002/0018217 | A1 * | 2/2002 | Weber-Grabau | G01N 21/956 356/601 |
| 2003/0147086 | A1 * | 8/2003 | Rosencwaig | G01B 11/00 356/601 |
| 2004/0156223 | A1 * | 8/2004 | Tanaka | G11C 29/006 365/145 |
| 2004/0185582 | A1 * | 9/2004 | Kueny | G01B 11/0625 438/7 |
| 2004/0207844 | A1 * | 10/2004 | Nabatova-Gabain | G01B 11/0641 356/369 |
| 2005/0015736 | A1 * | 1/2005 | Okuno | H01L 22/20 700/121 |
| 2005/0018183 | A1 * | 1/2005 | Shortt | G01B 11/0633 356/239.1 |
| 2005/0073692 | A1 * | 4/2005 | De Groot | G01B 11/0675 356/497 |
| 2005/0128489 | A1 * | 6/2005 | Bao | G01B 11/24 356/601 |
| 2005/0195413 | A1 * | 9/2005 | Brill | G01B 11/00 356/636 |
| 2005/0209816 | A1 * | 9/2005 | Vuong | G01N 21/4788 702/167 |
| 2005/0273753 | A1 * | 12/2005 | Sezginer | G03F 7/70425 716/52 |
| 2006/0244969 | A1 * | 11/2006 | Ryan | G01N 21/47 356/446 |
| 2007/0002337 | A1 * | 1/2007 | Li | G01B 11/24 356/625 |
| 2007/0010973 | A1 * | 1/2007 | deCecco | H03F 1/26 702/189 |
| 2007/0229807 | A1 * | 10/2007 | Lally | H01L 22/12 356/237.1 |
| 2008/0076045 | A1 * | 3/2008 | Willis | G03F 7/40 430/30 |
| 2008/0088832 | A1 * | 4/2008 | Cramer | G01N 21/956 356/237.4 |
| 2008/0183412 | A1 * | 7/2008 | Funk | G01B 11/0616 702/97 |
| 2009/0037134 | A1 * | 2/2009 | Kulkarni | G01N 21/9501 702/127 |
| 2009/0052612 | A1 * | 2/2009 | Wu | A61B 6/032 378/5 |
| 2009/0080597 | A1 * | 3/2009 | Basu | A61B 5/4869 378/5 |
| 2009/0082993 | A1 * | 3/2009 | Li | G01B 11/0625 702/155 |
| 2009/0187383 | A1 * | 7/2009 | Li | G01B 11/06 702/191 |
| 2009/0307163 | A1 * | 12/2009 | Jang | G01B 11/0641 706/14 |
| 2010/0017005 | A1 * | 1/2010 | Adel | H01L 22/12 700/97 |
| 2010/0106468 | A1 * | 4/2010 | Yamaguchi | G01R 31/31919 703/2 |
| 2010/0157315 | A1 * | 6/2010 | Bischoff | G01B 11/24 356/612 |
| 2010/0315627 | A1 | 12/2010 | Wu et al. | |
| 2011/0037988 | A1 | 2/2011 | Brill | |
| 2011/0096339 | A1 * | 4/2011 | Naot | G01B 11/02 356/630 |
| 2011/0098992 | A1 * | 4/2011 | Van Beurden | G03F 7/705 703/2 |
| 2011/0114951 | A1 * | 5/2011 | Kamikubo | G01B 11/06 257/48 |
| 2011/0218789 | A1 * | 9/2011 | Van Beurden | G03F 7/70625 703/13 |
| 2011/0229830 | A1 * | 9/2011 | Bhattacharyya | G03F 7/70633 430/325 |
| 2012/0033223 | A1 * | 2/2012 | Leewis | G03F 7/70625 356/446 |
| 2012/0069952 | A1 * | 3/2012 | Wu | A61B 6/032 378/5 |
| 2012/0323356 | A1 * | 12/2012 | Dziura | G01N 21/47 700/121 |
| 2013/0035911 | A1 * | 2/2013 | Pisarenco | G03F 7/705 703/2 |
| 2013/0132036 | A1 | 5/2013 | Saleh | |
| 2013/0151440 | A1 * | 6/2013 | Li | G01N 21/956 706/12 |
| 2013/0158957 | A1 * | 6/2013 | Lee | G06F 30/20 703/1 |
| 2013/0262044 | A1 * | 10/2013 | Pandev | G03F 7/705 703/1 |
| 2013/0304424 | A1 * | 11/2013 | Bakeman | G03F 7/70625 702/189 |
| 2014/0293295 | A1 * | 10/2014 | Kuwabara | H01L 22/12 356/630 |
| 2014/0295583 | A1 * | 10/2014 | Nakamoto | H01L 22/12 438/16 |
| 2014/0316730 | A1 * | 10/2014 | Shchegrov | H01L 22/20 702/81 |
| 2014/0340682 | A1 * | 11/2014 | Kwak | G01N 21/211 356/369 |
| 2014/0347666 | A1 * | 11/2014 | Veldman | G01N 21/211 356/369 |

(56) References Cited

U.S. PATENT DOCUMENTS

| | | | |
|---|---|---|---|
| 2014/0354969 A1* | 12/2014 | Elings | G03F 7/70508 |
| | | | 355/67 |
| 2015/0046118 A1* | 2/2015 | Pandev | H01L 22/12 |
| | | | 702/155 |
| 2015/0046121 A1* | 2/2015 | Dziura | G01N 21/956 |
| | | | 702/179 |
| 2015/0049333 A1* | 2/2015 | Gourley | G01N 15/1484 |
| | | | 356/338 |
| 2015/0058813 A1* | 2/2015 | Kim | G03F 7/70616 |
| | | | 716/52 |

OTHER PUBLICATIONS

Wikipedia Entry for "Deconvolution".*
Schuster, T. et al.; Influence of Line Edge Roughness (LER) on Angular Resolved and on Spectroscopiv Scatterometry; SimTech, Institute of Applied Optics, University of Stuttgart; No. 2008-20; Stuttgart, Germany.

\* cited by examiner

METHOD FOR QUANTIFICATION OF PROCESS NON UNIFORMITY USING MODEL-BASED METROLOGY

FIELD OF THE INVENTION

The present invention relates generally to semiconductor fabrication, and more particularly, to measurement of non-uniform features.

BACKGROUND OF THE INVENTION

Optical "scatterometry" attempts to evaluate the geometry of a sample based on the pattern of the diffracted light. More specifically, scatterometry systems use a modeling approach to transform scatterometry measurements into geometric measurements. For this type of approach, a theoretical model is defined for each physical structure that will be analyzed. The theoretical model predicts the empirical measurements (scatterometry signals) that scatterometry systems would record for the structure. The theoretical results of this calculation are then compared to the measured data. To the extent the results do not match, the theoretical model is modified and the theoretical data is calculated once again and compared to the empirical measurements. This process is repeated iteratively until the correspondence between the calculated theoretical data and the empirical measurements reaches an acceptable level of fitness. At this point, the characteristics of the theoretical model and the physical structure should be very similar.

Scatterometry takes the diffraction signal from a laser beam with a given spot size. Diffraction is an interaction of light with multiple periods of a structure. The current assumption is that the features are uniform within the laser spot. This assumption leads to inaccuracies. Furthermore, prior art systems are limited to a very specific set of analysis constraints. Broader analysis on a real-time basis is very desirable so that manufacturers can immediately determine when a process is not operating correctly.

SUMMARY OF THE INVENTION

In a first aspect, embodiments of the present invention provide a method for measuring non-uniformity of a layer on a semiconductor structure, comprising: acquiring a physical spectrum from the semiconductor wafer using an electromagnetic wave which provides a beam spot on the semiconductor structure; selecting a parameter for modeling; computing a plurality of simulated spectra, wherein the selected parameter is varied for computing each spectrum of the plurality of simulated spectra; computing a model based on the plurality of simulated spectra; determining a measure of non-uniformity within the beam spot for the selected parameter of the semiconductor wafer by comparing the physical spectrum to the computed model.

In a second aspect, embodiments of the present invention provide a non-transitory computer-readable storage medium comprising instructions, said instructions, when executed by a processor, performing the steps of: acquiring a physical spectrum from the semiconductor wafer using an electromagnetic wave which provides a beam spot on a semiconductor wafer; selecting a parameter for modeling; computing a plurality of simulated spectra, wherein the selected parameter is varied for computing each spectrum of the plurality of simulated spectra; computing a model based on the plurality of simulated spectra; and determining a measure of non-uniformity within the beam spot for the selected parameter of the semiconductor wafer by comparing the physical spectrum to the computed model.

In a third aspect, embodiments of the present invention provide a system for measuring non-uniformity of a layer on a semiconductor structure, comprising: a spectrum acquisition tool configured and disposed to produce a beam spot on the semiconductor wafer and generate raw spectra; a post-processing module configured and disposed to receive the raw spectra, wherein the post-processing module is configured and disposed to determine a measure of non-uniformity within the beam spot for the selected parameter of the semiconductor wafer by comparing the physical spectrum to the computed model; and a data output host system configured and disposed to receive the measure of non-uniformity from the post-processing module.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Figure 1:
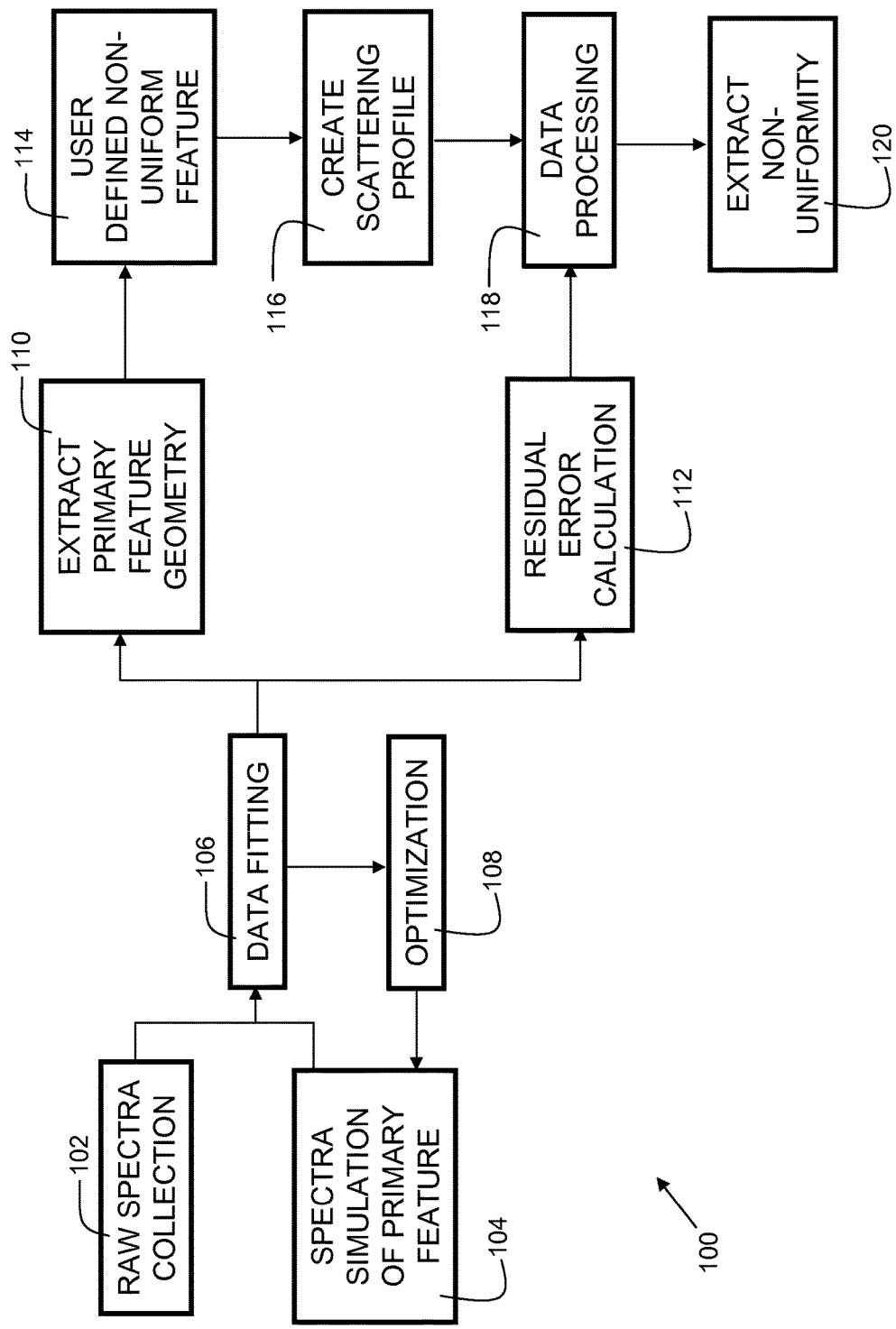

Often, similar elements may be referred to by similar numbers in various figures (FIGs) of the drawing, in which case typically the last two significant digits may be the same, the most significant digit being the number of the drawing figure (FIG). Furthermore, for clarity, some reference numbers may be omitted in certain drawings.

FIG. 1 is a flowchart indicating process steps for embodiments of the present invention.

Figure 2A:
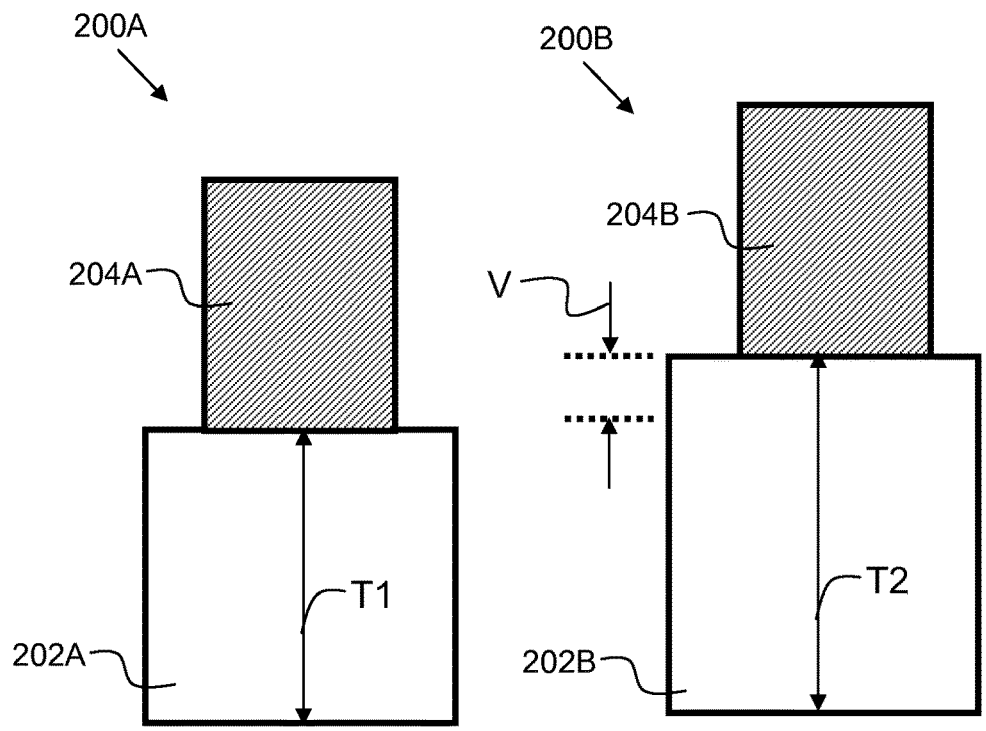
Figure 2B:
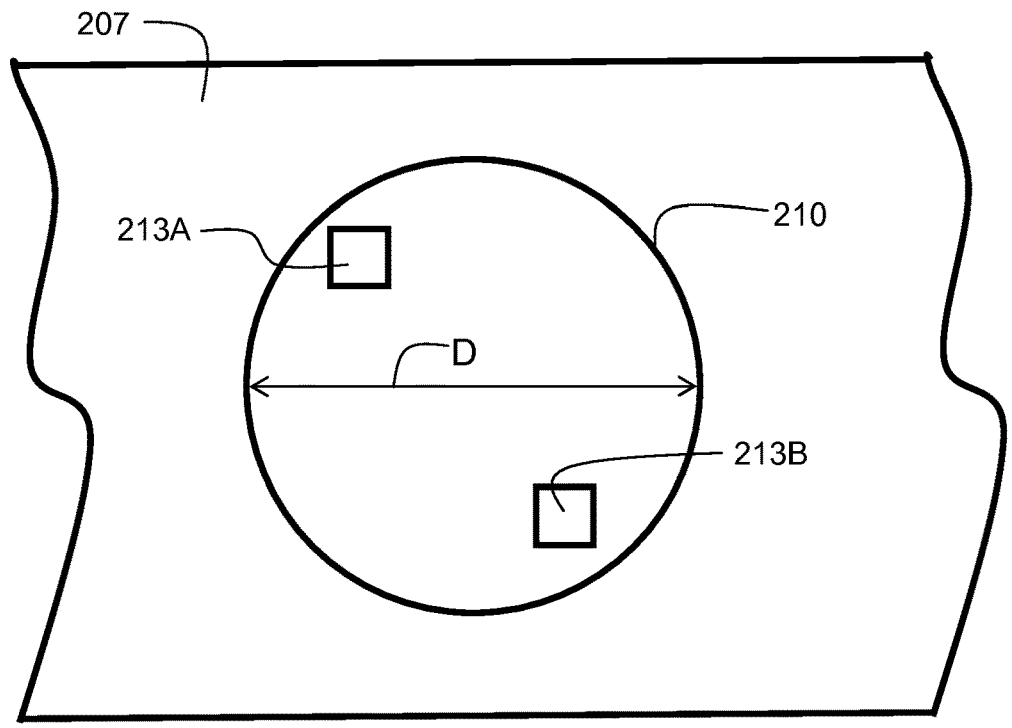

FIGS. 2A and 2B show an example of non-uniformity in a feature.

Figure 3C:
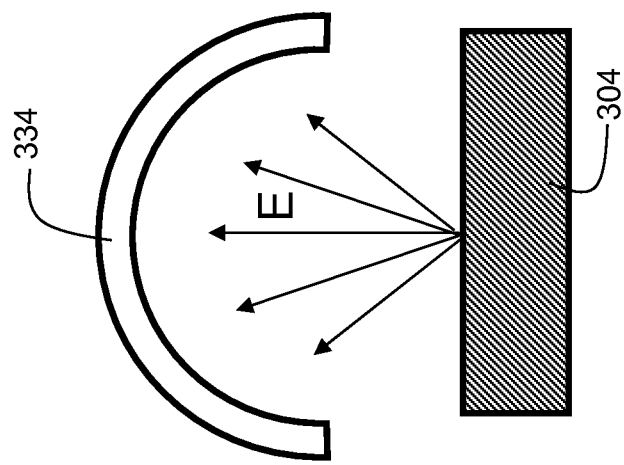
Figure 3B:
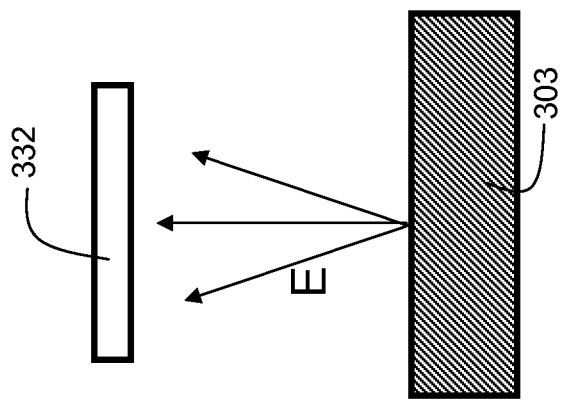
Figure 3A:
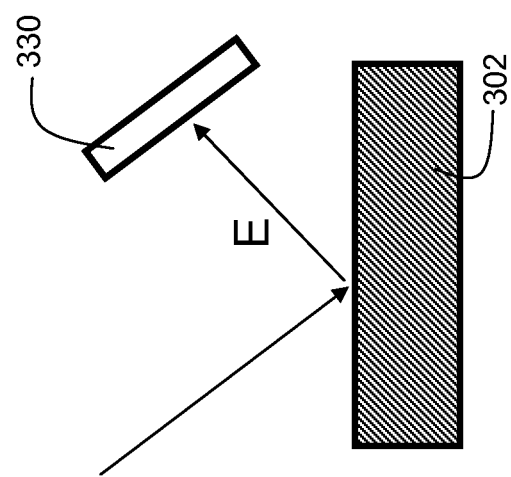

FIGS. 3A-3C show exemplary setups for physical measurements.

Figure 4:
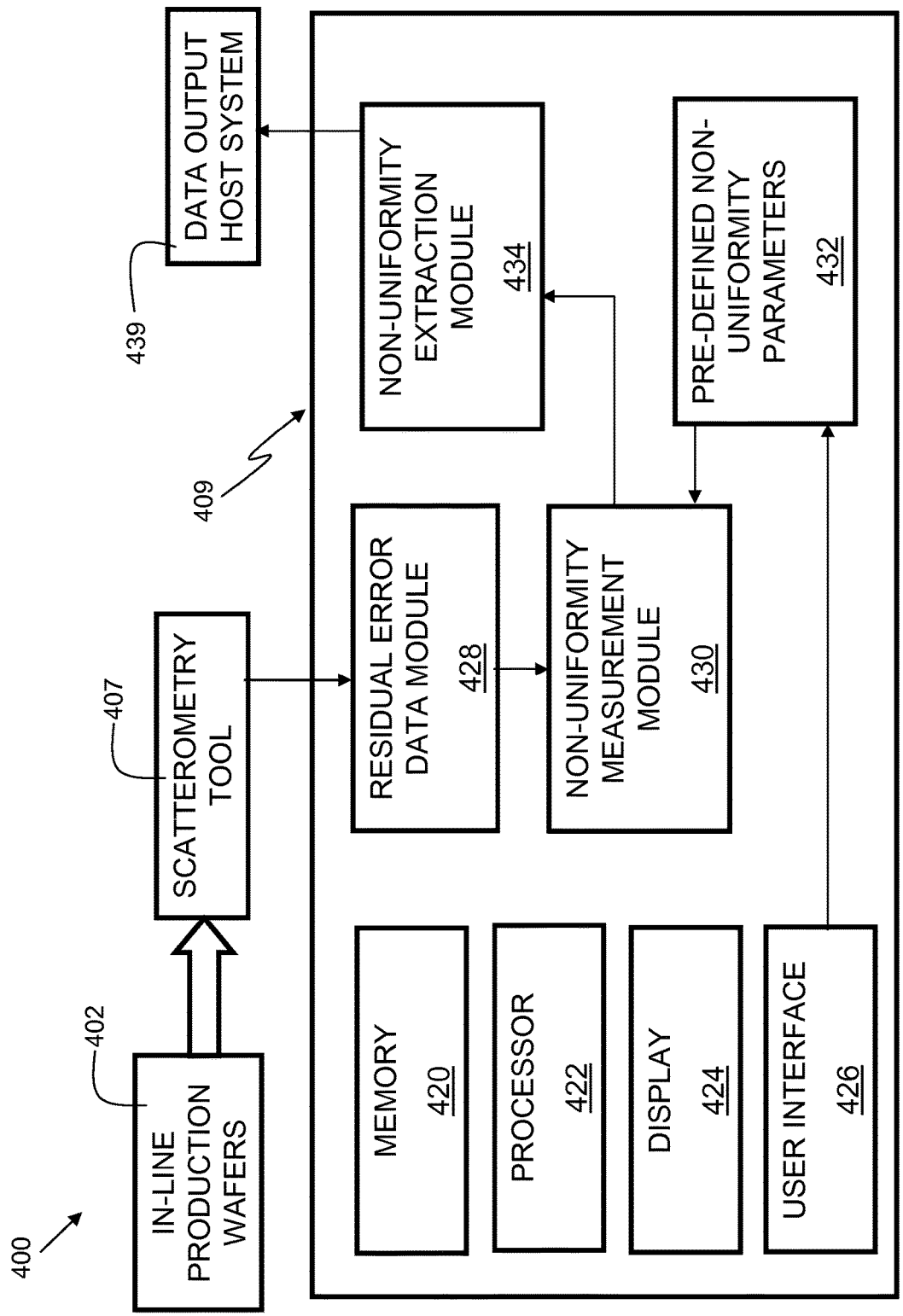

FIG. 4 is a system block diagram for embodiments of the present invention.

DETAILED DESCRIPTION

Embodiments of the present invention provide an improved method and system for assessing non-uniformity of features in the measurement area (within the beam spot) on a semiconductor structure, (e.g. wafer), such as a non-uniform film thickness. The scattering from non-uniform features is modeled. Post-processing the residual of theoretical and collected spectra is performed to assess a measure of non-uniformity from within an incident spot beam of a spectrum acquisition tool. Non-periodic topology differences have previously not been well accounted for in models. Embodiments of the present invention enable improved modeling for this type of manufacturing issue.

FIG. 1 is a flowchart 100 indicating process steps for embodiments of the present invention. In process step 102, raw (unprocessed) electromagnetic spectra are collected from physical samples. In embodiments, the raw spectra are acquired with a spectrum acquisition tool, such as a reflectometer tool or ellipsometer tool. In some embodiments, the spectrum acquisition tool comprises a small intensity detector. In other embodiments, the spectrum acquisition tool comprises a large field detector. In still other embodiments, the spectrum acquisition tool comprises a dome-like detector. In embodiments, the spectrum acquisition tool is configured and disposed to produce a beam spot having a diameter ranging from about 30 micrometers to about 50 micrometers. In other embodiments, the spectrum acquisition tool is configured and disposed to produce a beam spot having a diameter ranging from about 10 micrometers to about 25 micrometers. In still other embodiments, spectrum acquisition tool is configured and disposed to produce a beam spot having a diameter ranging from about 50 micrometers to about 80 micrometers. Independently, in process step 104, a simulation of spectra for a primary feature is performed. A primary feature represents an ideal, uniform case. For example, the simulated spectra may represent a blanket deposition oxide layer at a thickness of 100 nanometers. In practice, there is variation of thickness within the oxide layer. In some areas, the blanket oxide may have a thickness of 94 nanometers, while in other areas, the blanket oxide layer may have a thickness of 103 nanometers. However, for the purposes of simulating spectra from the primary feature, the blanket oxide layer is assumed to be the ideal case of 100 nanometers at all areas. In process step 106, a data fitting is performed between the raw spectra collected in process step 102, and the simulated spectra obtained in process step 104. In embodiments, the data fitting is performed using a linear regression technique. Optionally, in process step 108, optimizations are performed to the simulation, to reduce the error in the linear regression. The optimizations are fed back into the simulation step 104 to improve accuracy of the simulation of the primary feature. In process step 110, the primary feature geometry is extracted when the residual error cannot be further reduced by altering the geometric parameters of the primary feature. This represents a simulation of a primary feature (such as an evenly deposited film). In process step 112, a residual error calculation is derived. The residual error represents an error between physical samples that were measured in a spectrum acquisition tool, and the simulation data of the ideal case extracted in step 110. In embodiments, the residual error is the difference between model and experimental data after geometric parameters in the model are adjusted to best match the experimental data under the assumption of zero non-uniformity and perfect periodicity. In process step 114, a user specifies a particular non-uniform feature of interest to be solved for. For example, the feature of interest may include, but is not limited to, local thickness variation of a film, or density, line edge roughness, and line width variation of a grating. In embodiments, the user is able to input a minimum parameter value (e.g. a minimum thickness), and a maximum parameter value (e.g. a maximum thickness). Other parameters, such as the gradient (rate of change of the parameter as a function of distance), and iterator value (how much to increment the parameter for each subsequent simulation) may also be included in process step 114. In process step 116, a scattering profile is derived. The scattering profile is created by varying the parameter of interest identified in step 114, and computing multiple simulated spectra for different levels of non-uniformity for the given parameter. In process step 118, the scattering profile is compared with the residual error calculation in process step 112, and a measure of the non-uniformity is computed. In one embodiment, the non-uniformity is computed by the following formula:

$$\Delta|E|^2\text{total}(k,r,\theta) = \int |\Sigma|^2 \rho(x) dx$$

where:
r is the distance from the sample to the detector;
k is the wave number;
θ is the angle from the point being measured to the detector; and
x is the size of the non-uniformity.

The total change in collected signal is the convolution of the scattering with the density distribution of non-uniformity, $\rho(x)$.

Embodiments of the present invention may use a variety of techniques to deconvolve the density function as part of generating a measure of non-uniformity. In some embodiments, the deconvolution technique may include a Fourier transform, constraint optimization, cubic spline basis function, maximum entropy algorithm, or genetic algorithm.

Embodiments of the present invention may utilize a variety of techniques to model the scattering. Some embodiments may utilize Rayleigh scattering, geometric scattering, Rigorous Coupled Wave Analysis (RCWA), or the Mie solution to Maxwell's equations. In some embodiments, finite element method (FEM), or finite difference time domain (FDTD) techniques may be used.

In process step 120, the modified scattering profile is recorded to establish a measure of non-uniformity of the feature identified in process step 114. In a production environment, electromagnetic spectra of physical samples can be acquired and compared to the extracted non-uniformity obtained in process step 120, to obtain a measure of non-uniformity of a given feature (e.g. an oxide film). In this way, improved in-situ monitoring can be achieved, resulting in improved product yield.

FIG. 2A is an example of non-uniformity in a feature. Structure 200A represents a structure at a first location within the area within the incident beam spot. Structure 200B represents a structure at a second location within the same incident beam spot. In the first location, structure 200A has substrate 202A and film layer 204A. In the second location, structure 200B has substrate 202B and film layer 204B. Substrate 202A has thickness T1, and substrate 202B has thickness T2. In the ideal case, T1 is equal to T2. However, in reality, variations in processes such as planarization processes (e.g. chemical mechanical polishing) cause variations in thickness at different areas of the wafer. The difference V between T1 and T2 is a measure of the non-uniformity.

FIG. 2B shows a substrate 207 with an incident beam spot 210, having diameter D. Incident beam spot 210 is the spot on the surface of substrate 207 that is created by an incident electromagnetic wave which is used for a reflectometry or ellipsometry measurement. In some embodiments, diameter D may range from about 30 micrometers to about 50 micrometers. In other embodiments, diameter D may range from about 10 micrometers to about 25 micrometers. In still other embodiments, diameter D may range from about 50 micrometers to about 80 micrometers. Within the beam spot 210, area 213A is representing an exemplary location of structure 200A, and area 213B is representing an exemplary location of structure 200B. In prior art systems, the topology within the beam spot is assumed to be completely uniform. In embodiments of the present invention, non-uniformity within the beam spot is able to be accounted for, thereby improving the resolution of the measurements.

FIGS. 3A-3C show exemplary setups for physical measurements. FIG. 3A shows a spectrum acquisition setup for a small intensity detector 330, such as a reflectometer or ellipsometer. With an ellipsometer, the measured signal is representative of the change in polarization as the incident electromagnetic wave E interacts with the sample (302-304) The response detected by the detectors (330, 332, 334) depend on how much of the incident beam is reflected, absorbed, or scattered. Non-uniformity of the feature of interest (e.g. a deposited film) affects amplitude and phase shifts of the reflectance detected by the detectors. Electromagnetic wave E is incident on sample 302 and reflected into detector 330. FIG. 3B shows a spectrum acquisition setup for a large field profile detector, such as a beam profile reflectometer. Electromagnetic energy E is incident on sample 303 and reflected into detector 332. FIG. 3C shows a spectrum acquisition setup for a dome-like detector. Reflected electromagnetic waves from sample 304 are collected by detector 334.

FIG. 4 is a block diagram of a system 400 in accordance with embodiments of the present invention. Production semiconductor wafers are input to a scatterometry tool 407, which acquires raw spectra from the wafers. The scatterometry tool 407 may utilize a spectrum acquisition setup similar to one of those shown in FIGS. 3A-3C. A post-processing module 409 receives raw spectra from the scatterometry tool 407. In embodiments, the post-processing system 409 may be a computer comprising memory 420, and a processor 422 which is coupled to memory 420, such that the processor 422 may be configured to read and write memory 420. In some embodiments, multiple processors or cores may be used. The memory 420 may be a non-transitory computer-readable medium, such as flash, ROM, non-volatile static ram, or other non-transitory memory. The memory 420 contains instructions that, when executed by processor 422, control the various subsystems to operate system 400. Post-processing system 409 may also include a display 424 and a user interface 426 for interacting with the post-processing system 409. The user interface 426 may include a keyboard, touch screen, mouse, or the like.

The memory 420 contains machine instructions that implement a plurality of modules. A residual data error module 428 computes a residual error of the acquired spectra from the scatterometry tool 407 as compared to a primary feature geometry (see 110 of FIG. 1). Pre-defined non-uniformity parameters 432 may be received via the user interface 426, and are input to the non-uniformity measurement module. The pre-defined non-uniformity parameters may include the feature of interest, and the parameter for that feature. For example, the feature may be a particular film layer, and the parameter may be the film thickness. The non-uniformity measurement module 430 generates simulated spectra by varying the selected parameter over a pre-determined range, and generating a model of the non-uniformity of the specified feature. The non-uniformity extraction module 434 computes the non-uniformity of the in-line production wafers 402 using the model generated by the non-uniformity measurement module 430, and sends the data to the host system 439. The host system 439 may be configured to issue alerts based on the results from the non-uniformity extraction module 434 if the measured non-uniformity exceeds a pre-determined threshold. Additionally, the host system 439 may be configured to communicate with various production tools to adjust recipe parameters in response to results from the non-uniformity extraction module 434.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A computer-implemented method for measuring non-uniformity of a layer within a beam spot on a semiconductor structure, comprising:
   acquiring, during an in-line semiconductor production process, a physical spectrum from a detector that detects an electromagnetic wave reflected from a semiconductor wafer by a beam spot on the semiconductor structure, the beam spot having a diameter of 10 to 25 micrometers;
   determining a first simulation of spectra for an ideal layer;
   selecting a parameter and a gradient of the parameter for modeling, the selected parameter comprising a local thickness, density, line edge roughness, or line width;
   creating a scattering profile by computing multiple simulated spectra for different levels of non-uniformity for the selected parameter;
   determining a residual error within the beam spot for the selected parameter, wherein the residual error is computed as a difference between the physical spectrum and an extracted spectra of the multiple simulated spectra under the assumption of zero non-uniformity and perfect periodicity;
   determining a measure of non-uniformity of the selected parameter within the beam spot by comparing the residual error with the scattering profile, wherein determining the measure of non-uniformity further includes deconvolving a density function utilizing a cubic spline basis function; and
   adjusting at least one recipe parameter of a production tool for manufacturing a semiconductor device based on the measure of non-uniformity within the beam spot, wherein the at least one recipe parameter includes a thickness of a deposited film, thereby changing the operation of the production tools to change an output of a semiconductor manufacturing process.

2. The method of claim 1, wherein acquiring a physical spectrum comprises using an ellipsometer.

3. The method of claim 1, wherein acquiring a physical spectrum comprises using a reflectometer.

4. The method of claim 1, further comprising:
   establishing a minimum value for the selected parameter; and
   establishing a maximum value for the selected parameter.

5. The method of claim 1, wherein computing a model based on the plurality of simulated spectra comprises using rigorous coupled wave analysis.

6. The method of claim 1, wherein determining a measure of non-uniformity comprises the use of Rayleigh scattering.

7. The method of claim 1, wherein determining a measure of non-uniformity comprises the use of Mie solution.

8. The method of claim 1, wherein determining a measure of non-uniformity comprises the use of a technique selected from the group consisting of: finite element method (FEM), and finite difference time domain (FDTD) technique.

9. A non-transitory computer-readable storage medium comprising instructions, said instructions, when executed by a processor, perform the steps of:

acquiring, during an in-line semiconductor production process, a physical spectrum from a semiconductor wafer using an electromagnetic wave which provides a beam spot on the semiconductor wafer, the beam spot having a diameter of 30 to 50 micrometers;

determining a first simulation of spectra for an ideal layer;

selecting a parameter and a gradient of the parameter for modeling, the selected parameter comprising a local thickness, density, line edge roughness, or line width;

creating a scattering profile by computing multiple simulated spectra for different levels of non-uniformity for the selected parameter;

determining a residual error within the beam spot for the selected parameter, wherein the residual error is computed as a difference between the physical spectrum and an extracted spectra of the multiple simulated spectra under the assumption of zero non-uniformity and perfect periodicity;

determining a measure of non-uniformity of the selected parameter within the beam spot by comparing the residual error with the scattering profile, wherein determining the measure of non-uniformity further includes deconvolving a density function utilizing a cubic spline basis function; and adjusting at least one recipe parameter of a production tool for manufacturing a semiconductor device based on the measure of non-uniformity within the beam spot, wherein the at least one recipe parameter includes a thickness of a deposited film, thereby changing the operation of the production tools to change an output of a semiconductor manufacturing process.

10. The non-transitory computer-readable storage medium of claim 9, further comprising instructions that, when executed by a processor, perform the steps of:

establishing a minimum value for the selected parameter; and establishing a maximum value for the selected parameter.

11. A system for measuring non-uniformity of a layer within a beam spot on a semiconductor structure, the system comprising:

a spectrum acquisition tool configured and disposed to produce a beam spot on a semiconductor wafer during an in-line semiconductor production process and generate raw spectra, the beam spot having a diameter of 50 to 80 micrometers;

a post-processing module configured and disposed to receive the raw spectra and determine a measure of non-uniformity within the beam spot for a selected parameter of line edge roughness for the semiconductor wafer; and a data output host system configured and disposed to receive the measure of non-uniformity from the post-processing module;

a processor; and a non-transitory computer-readable storage medium comprising instructions, said instructions, when executed by the processor, perform the steps of:

acquiring a physical spectrum from the semiconductor wafer using an electromagnetic wave which provides a beam spot on the semiconductor wafer;

determining a first simulation of spectra for an ideal layer;

selecting a parameter and a gradient of the parameter for modeling, the selected parameter comprising a local thickness, density, line edge roughness, or line width;

creating a scattering profile by computing multiple simulated spectra for different levels of non-uniformity for the selected parameter;

determining a residual error within the beam spot for the selected parameter, wherein the residual error is computed as a difference between the physical spectrum and an extracted spectra of the multiple simulated spectra under the assumption of zero non-uniformity and perfect periodicity;

determining a measure of non-uniformity of the selected parameter within the beam spot by comparing the residual error with the scattering profile, wherein determining the measure of non-uniformity further includes deconvolving a density function utilizing a cubic spline basis function; and adjusting at least one recipe parameter of a production tool for manufacturing a semiconductor device based on the measure of non-uniformity within the beam spot, wherein the at least one recipe parameter includes a thickness of a deposited film, thereby changing the operation of the production tools to change an output of a semiconductor manufacturing process.

12. The system of claim 11, wherein the spectrum acquisition tool is a reflectometer.

13. The system of claim 11, wherein the spectrum acquisition tool is an ellipsometer.

14. The system of claim 11, wherein the data output host system is configured to issue an alert if the measure non-uniformity exceeds a pre-determined threshold.

* * * * *